April 7, 1959 W. S. BLANDING ET AL 2,880,697
COATING APPARATUS
Filed April 19, 1957 2 Sheets-Sheet 1

INVENTORS
WENDELL S. BLANDING
AND FRANK ZIMAR

BY Clarence R. Patty, Jr.
ATTORNEY

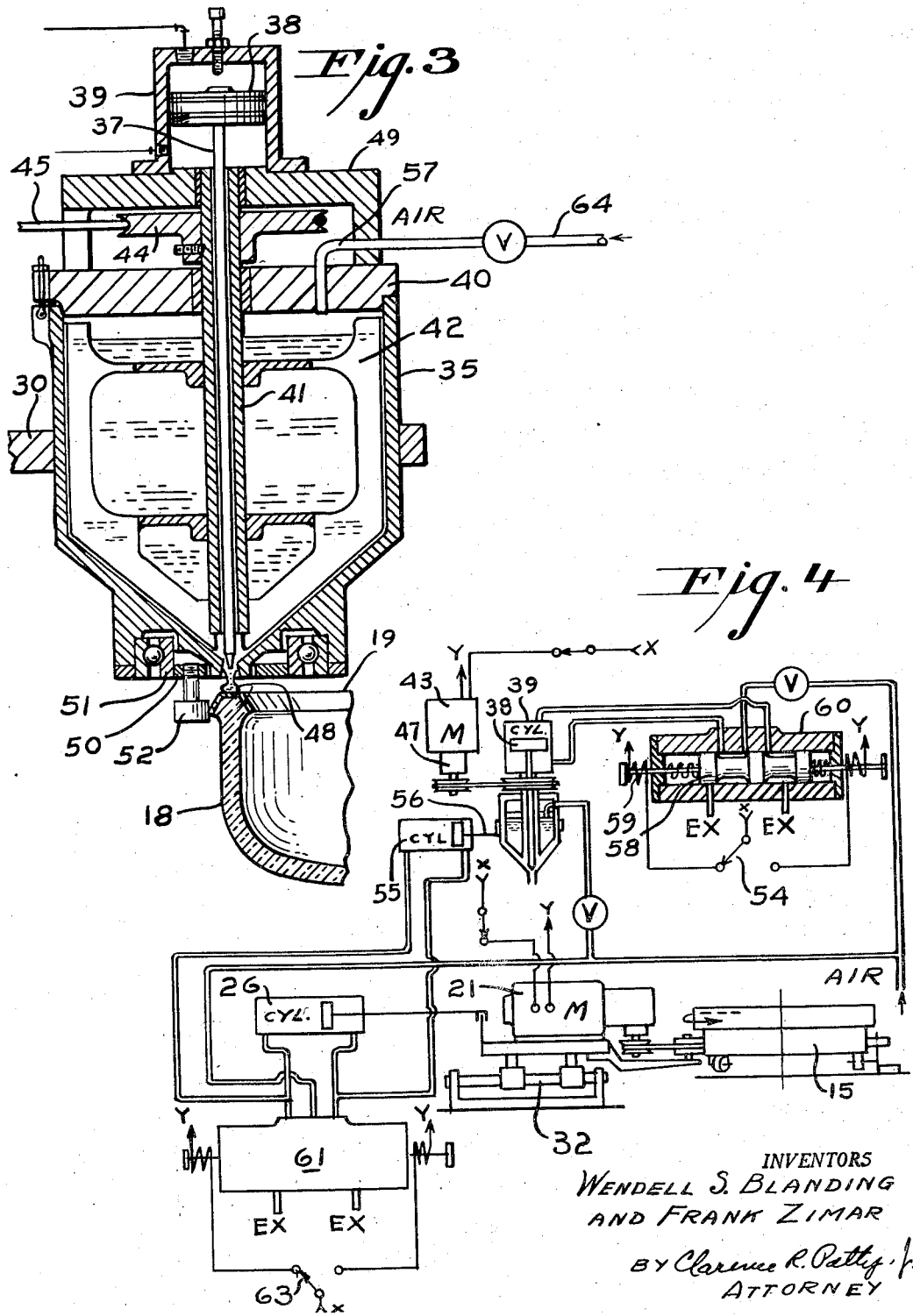

United States Patent Office

2,880,697
Patented Apr. 7, 1959

2,880,697

COATING APPARATUS

Wendell S. Blanding, Painted Post, and Frank Zimar, Corning, N.Y., assignors to Corning Glass Works, Corning, N.Y., a corporation of New York Application April 19, 1957, Serial No. 653,996

5 Claims. (Cl. 118—320)

The present invention relates to coating apparatus, but is primarily concerned with the application of a solder glass frit or the like to the mating surfaces of articles to be subsequently brought together and fusion sealed to one another through the medium of such frit.

By way of example the invention is hereinafter embodied in an apparatus suitable for applying a rather viscous suspension of a thermal sealing glass frit or the like to the mating surfaces of television picture tube panels and funnels respectively.

According to the invention a suspension of thermal setting sealing glass frit is applied directly to a sealing surface by extrusion of frit thereonto from an orifice in the bottom of a storage tank which is equipped with motor driven stirrer blades to maintain the frit in suspension. Conveniently, the article is arranged to travel about a path that progressively passes the surface to be coated under such orifice.

For a better understanding of the invention reference is made to the accompanying drawings wherein:

Fig. 3 is a sectional elevation, on an enlarged scale, of a fragment of the apparatus in operation and of a panel whose sealing surface is being coated.

Fig. 4 is a piping and wiring diagram, and includes a schematic showing of the apparatus.

Figure 1:
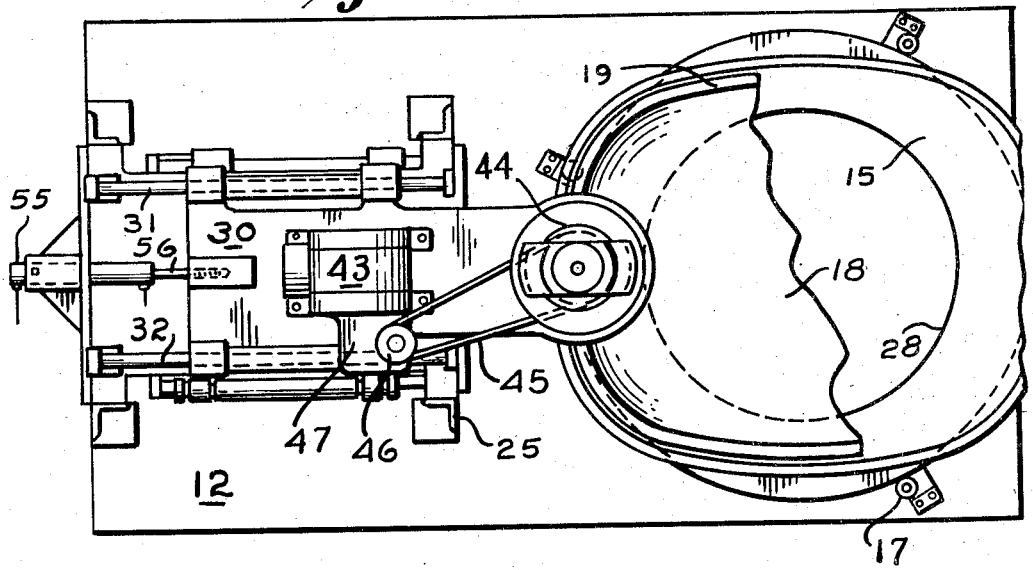
Fig. 1 is a plan view of a coating apparatus embodying the invention showing a television panel, partly broken away, associated therewith.

Referring to the drawings in detail, the apparatus as shown embodies a suitable carriage 11 having a bed 12 upon which the various essential elements of the assembly are arranged.

A panel-funnel support 15 is arranged for rotation about a vertical axis by being supported on three rollers, such as 16 spaced 120° from one another on the bed 12 and laterally confined by three similarly arranged rollers such as 17.

Figure 2:
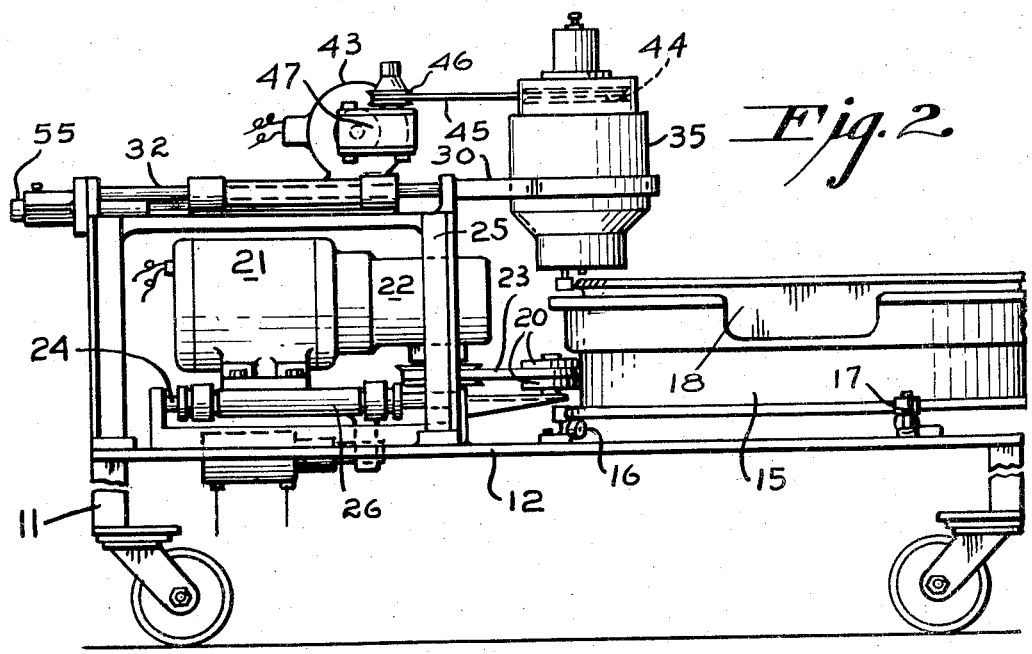
Fig. 2 is a side elevational view of the apparatus and panel of Fig. 1.

Rotation of support 15 is effected by means of a friction drive roller 20 (Fig. 2) adapted to be driven by a motor 21 through the medium of a gear reduction unit 22 and a belt 23. The motor 21 is arranged within a frame 25 and is slidably mounted on two rods such as 24 to bring the friction roller 20 into and out of driving relation with the support 15. A pneumatic cylinder 26 is provided for effecting such movements, as most clearly shown in Fig. 4. As may be seen in Fig. 1, the support 15 is suitably shaped to cradle a panel such as 18 therein with its sealing surface 19 made available to the outlet of tank 35, as shown in Figs. 2 and 3. The large aperture 28 through support 15 and an aperture (not shown) through the bed 12 permits the similar cradling of a funnel (not shown) in such support.

At the top of frame 25 there is provided a platform 30 adapted for sliding movement on rods 31 and 32 in a plane parallel to the plane of movement of motor 21, by means of the piston rod 56 of a pneumatic cylinder unit 55, as required to advance a frit storage container or tank 35, carried by support 30, over the border of support 15. Tank 35 is provided with a centrally arranged bottom outlet adapted to be selectively opened and closed by a valve comprising needle 37 depending from a piston 38 of a pneumatic cylinder 39 supported on a pulley cover 49 arranged on the top 40 of tank 35. The supplying of operating air to the cylinder 39 is under control of a conventional four-way valve 60 (Fig. 4) as will be described later.

Surrounding needle 37 is a stirrer shaft 41 to which is fixed a number of blades such as 42. Shaft 41 is adapted to be driven by a motor 43 through the medium of a stirrer shaft pulley 44, a belt 45, and a pulley 46 driven by a gear reduction unit 47. The orifice of tank 35 is surrounded by an annular disc 50 press fitted into the inner race 51 of a ball bearing assembly and has depending therefrom a stub shaft carrying a roller 52 for engaging the border of a supported article to continuously maintain the tank orifice properly aligned over the article surface to be frit coated as the article is being rotated. To continuously maintain roller 52 in engagement with an article, even though such article in the example shown is generally rectangular, the platform 30 is adapted to be continuously lightly urged in a direction to maintain the roller 52 in engagement with the article wall by means of a pneumatic cylinder 55 having its piston rod 56 coupled to such platform. The pneumatic unit 55 is under control of a four-way valve 61 that is similar to valve 60.

Although the frit employed forms no part of the present invention, it ordinarily comprises a ground thermal setting sealing glass maintained in suspension in a vehicle composed of nitrocellulose dissolved in amyl acetate. Preferably the viscosity of the frit suspension exceeds that which would freely flow by gravity and, accordingly, an air line 64 to the tank interior is provided in order to maintain a slightly positive pressure therein to aid in the extrusion.

To prepare the coating apparatus for use, the tank cover 40 is removed and a charge of frit in suspension poured thereinto and the cover replaced. The circuit for motor 43 is then closed to operate the stirrer blades and thus maintain the frit in suspension.

Normally the spool 58 of valve 60 and the spool (not shown) of valve 61 block the passage of air to the cylinders 39, 26 and 55 respectively. Since however the machine, as shown is assumed to be operating, the spools of valves 58 and 60 are in their rightward positions and therefore air is being fed to the left ends of cylinders 26 and 25 and to the lower end of cylinder 39. With the circuit to motor 43 closed support 15 is being rotated as a result of the engagement of the drive roller 20 with support 15. Under such circumstances and with the needle 37 raised by piston 38 of unit 39 a stream of frit 48 is being distributed along the length of surface 19.

At the moment that it is evident that the issuing frit will join that initially deposited and thus form a continuous endless strip of frit on the sealing surface, an operator moves a switch 54 from its left to its right contact thus reversing the position of the spool 58 of valve 60 and the air supply connections to cylinder 39 to lower needle 37 and thus discontinue the issuance of frit from tank 35. This operation is then followed by movement of the switch 63 from its left to its right contact to cause valve 61 to reverse the air connections to cylinders 26 and 55. The cylinder 26 thus withdraws the drive roller 20 from engagement with support 15 to discontinue its rotation, while the rod 56 of cylinder 55 moves the tank 35 to the left to permit the ready removal of the panel 18 from support 15 and its replacement with another or with a funnel.

Following the placement of a panel or funnel on support 15 the attendant first restores the switch 63 to the position shown to again shift the tank 35 to a position in which its outlet is over the edge of support 15, and to again bring roller 20 into driving relation with the support; and finally returns the switch 54 to the position shown to again initiate the issuance of frit from tank 35. As will be understood the motors 21 and 43 are permitted to rotate continuously between the respective coating operations. In fact it is imperative to satisfactory operation that agitation of the frit be carried on without interruption, to prevent the frit from settling and solidifying in the tank bottom.

What is claimed is:

1. In an article coating apparatus, a rotatable article support, means for effecting rotation of said support, a coating material container having a bottom outlet and being laterally movable to a position over said support, a freely rotatable annular element surrounding such outlet and having a depending stub shaft equipped with a roller, and means for laterally moving said container to a position in which said roller engages the border of a supported article, said roller being operative during rotation of the article to maintain the container in a predetermined uniform position with respect to the article border during rotation of the article by its support.

2. In an apparatus for coating an endless path on an article surface uniformly spaced from its lateral border, an article support rotatable about a vertical axis, a coating material container having a bottom outlet, means for yieldingly laterally moving said container to a position in which its outlet is arranged over an area of the surface of a supported article to be coated, means for rotating said support, a roller cooperative with the lateral border of the article to establish the initial position of the container over the article, a support for said roller rotatable about the outlet to maintain it in the exact relationship with respect to the periphery of the article during its rotation irrespective of variations in curvature of the article outline and means for regulating the issuance of coating material from the container outlet onto such article during its rotation.

3. A coating apparatus such as defined by claim 2 wherein the article support has article engaging surfaces conforming to bottom surfaces of television tube panels and funnels, respectively, whose top surfaces have complementary sealing surfaces to be coated so that the article arranged on said support, be it a funnel or a panel, has its sealing surface upwardly disposed and available to the outlet.

4. An apparatus such as defined by claim 2 wherein the means for yieldingly laterally moving the container includes a slidably movable platform and a pneumatic operating unit therefor.

5. An apparatus such as defined by claim 4 wherein the means for rotating the article support includes a slidable support provided with a motor driven roller arranged for driving engagement with said article support by movement of said slidable support toward the article support and pneumatic means for so moving such support.

References Cited in the file of this patent

UNITED STATES PATENTS

| 1,387,963 | Bourn | Aug. 16, 1921 |
| 2,544,172 | Naugler | Mar. 6, 1951 |
| 2,726,632 | Asbeck et al. | Dec. 13, 1955 |